UNITED STATES PATENT OFFICE.

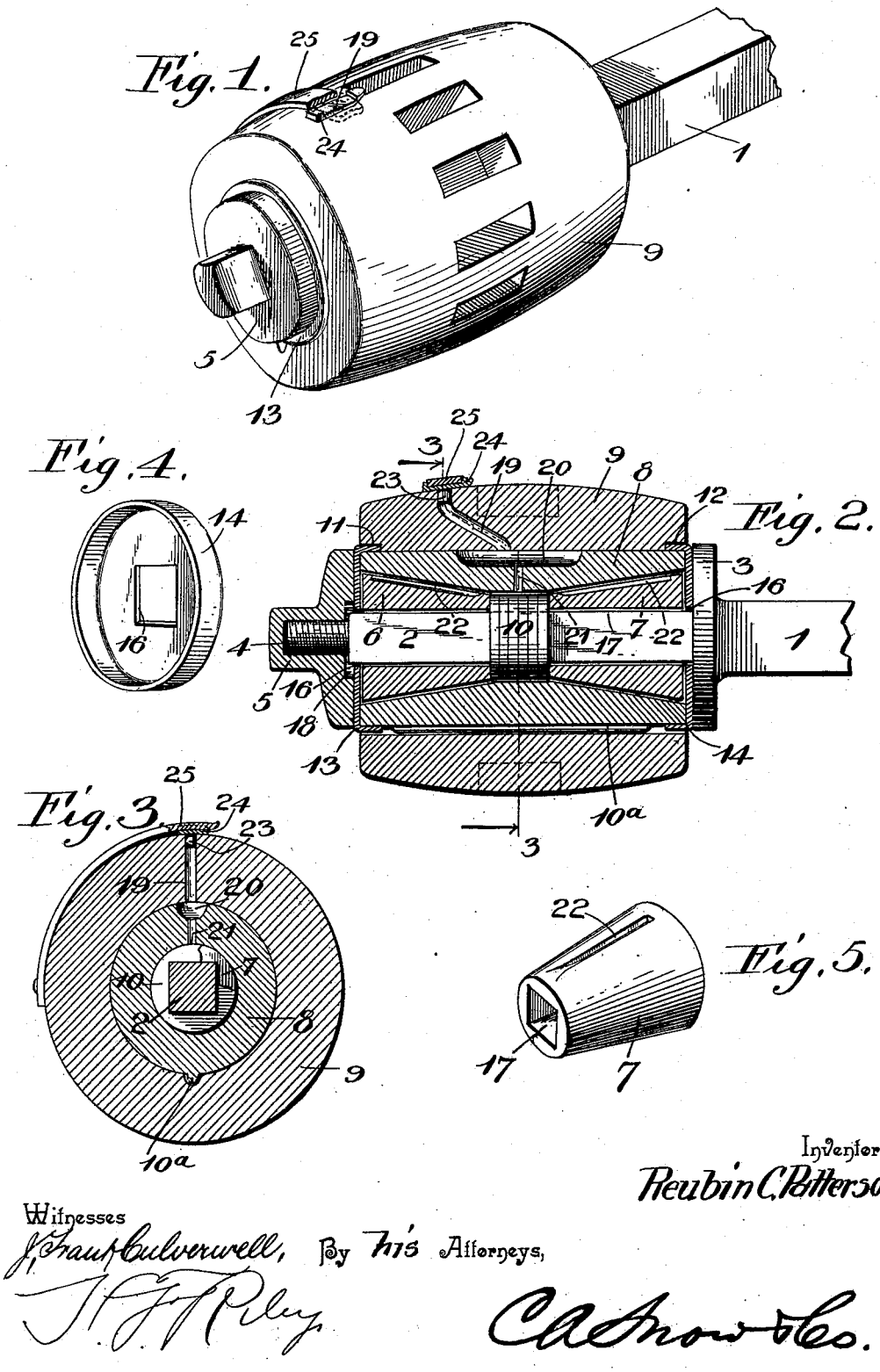
(No Model.)
R. C. PATTERSON.
AXLE BEARING FOR VEHICLE WHEELS.
No. 602,100. Patented Apr. 12, 1898.

REUBIN C. PATTERSON, OF SUMMIT, GEORGIA.

AXLE-BEARING FOR VEHICLE-WHEELS.

SPECIFICATION forming part of Letters Patent No. 602,100, dated April 12, 1898.

Application filed October 8, 1897. Serial No. 654,544. (No model.)

*To all whom it may concern:*

Be it known that I, REUBIN C. PATTERSON, a citizen of the United States, residing at Summit, in the county of Emanuel and State of Georgia, have invented a new and useful Axle-Bearing for Vehicle-Wheels, of which the following is a specification.

The invention relates to improvements in axle-bearings for vehicle-wheels.

The object of the present invention is to improve the construction of axle-bearings for vehicle-wheels and to provide a simple, inexpensive, and efficient device which will be light and capable of ready adjustment to take up the wear of the parts, so that a wheel will run steady at all times.

A further object of the invention is to render the bearing dust-proof and to provide a self-lubricating device which will direct the lubricant from the ends of the bearing toward the center of the same to prevent it from wasting.

The invention consists in the construction and novel combination and arrangement of parts, as hereinafter fully described, illustrated in the accompanying drawings, and pointed out in the claims hereto appended.

In the drawings, Figure 1 is a perspective view of a hub and axle constructed in accordance with this invention. Fig. 2 is a longitudinal sectional view of the same. Fig. 3 is a transverse sectional view on line 3 3 of Fig. 2. Fig. 4 is a detail perspective view of one of the dust-caps. Fig. 5 is a similar view of one of the conical bearing-sleeves.

Like numerals of reference designate corresponding parts in the several figures of the drawings.

1 designates an axle provided with a polygonal spindle portion 2 and having a shoulder 3 at the inner end thereof and a threaded portion 4 at the outer end for the reception of an axle-nut 5. The spindle has an axle-skein consisting of inner and outer reversely-arranged conical bearing-sleeves 6 and 7, which fit within an axle-box 8 of a hub 9, and a series of removable washers 10 are interposed between the inner ends of the conical bearing-sleeves and are adapted to be removed one at a time as the bearing becomes worn, so that the conical bearing-sleeves may be advanced into the axle-box to take up the wear.

As the washers, which are preferably constructed of leather, are removed from the center of the spindle they are arranged at the outer end of the outer conical bearing-sleeve 6 in order to obviate the necessity of increasing the threaded portion 4 of the axle and advancing the nut on the same.

The axle-box is secured within the hub by means of a flange $10^a$, disposed longitudinally of the axle-box and engaging a longitudinal groove of the hub in the usual manner. The hub is provided at its inner and outer ends with annular recesses 11 and 12, receiving annular flanges of inner and outer dust-caps 13 and 14, which exclude dust from the bearing and prevent the escape of oil. These dust-caps 13 and 14 are provided with polygonal openings 16 to conform to the configuration of the polygonal portion 2 of the axle and are thereby held against rotation, and the openings 17 of the conical bearing-sleeves are also shaped to conform to the configuration of the axle, which, although shown square in the drawings, may be of any other polygonal or non-circular shape.

When the central washers 10 are removed to take up the wear, they are designed to be interposed between the outer dust-cap and the adjacent conical bearing-sleeve, and the axle-nut is provided at its inner face with a recess 18 to enable it to extend over the outer end of the portion 2 of the axle and hold the outer dust-cap thereon.

The hub is provided at its outer portion with an oil hole or passage 19, extending inward at a slight angle to a recess 20 of the axle-box. The recess 20, which is located at the center of the hub, forms an oil chamber or reservoir and communicates with the center of the bearing by a straight passage or bore 21, which terminates at the washers 10. The lubricant is delivered to the bearing at the center thereof and is distributed over the bearing-surfaces through the rotation of the wheel, and in order to conduct the oil back to the center and thereby prevent it from leaking and wasting at the ends of the hub the conical bearing-sleeves are provided in their upper faces with longitudinal grooves or gutters 22, terminating short of the outer ends of the sleeves. The oil collects in the grooves or gutters, which are inclined and cause the lubricant to run toward the center of the bearing.

The outer end of the oil hole or passage is normally closed by a plug 23, fitting in the hole or passage and provided at its outer end with a head 24, which bears against the outer face of the hub and which is engaged by a spring 25. The spring 25, which is secured at one end to the hub, has its free end fitting in a recess of the head 24, whereby it is prevented from slipping out of engagement with the same.

When it is desired to supply the wheel with oil, the spring is lifted and the plug removed, and the spring securely retains the plug in the outer end of the oil hole or passage and enables the latter to be quickly exposed when desired.

The invention has the following advantages: The hub and its bearing are light, strong, and inexpensive in construction. The device is self-lubricating and the lubricant is directed from the ends of the hub toward the center to prevent leakage and waste. The bearing is dust-proof, and any wear of the parts may be readily taken up, so that the wheel will run steady at all times.

Changes in the form, proportion, and minor details of construction may be resorted to without departing from the spirit or sacrificing any of the advantages of this invention.

What I claim is—

1. In a device of the class described, the combination of an axle, conical bearing-sleeves mounted on the axle, a hub having an axle-box fitting the bearing-sleeves, said hub being provided at its ends with annular recesses, the inner and outer dust-caps mounted on the axle, extending over the ends of the bearing-sleeves and the axle-box and provided with annular flanges extending into the annular recesses of the hub, and an axle-nut, substantially as described.

2. In a device of the class described, the combination of an axle, a hub provided with an axle-box and having a central oil-supply passage, and conical bearing-sleeves mounted on the axle and provided at their upper faces with longitudinal grooves or gutters terminating short of the outer ends of the sleeves to close their outer terminals and adapted to return oil to the center of the bearing, substantially as described.

3. In a device of the class described, the combination of an axle, conical bearing-sleeves, a hub having an axle-box, dust-caps arranged at the ends of the axle-box and mounted on the axle, an axle-nut, and a central series of washers interposed between the adjacent ends of the bearing-sleeves and adapted to be removed to permit the bearing-sleeves to be advanced for taking up the wear, the washers removed from the central series being designed to be arranged on the axle between the outer dust-cap and the outer bearing-sleeve, substantially as described.

4. In a device of the class described, the combination of an axle, conical bearing-sleeves mounted on the axle and provided at their upper faces with longitudinal grooves or gutters terminating short of the outer ends of the sleeves and adapted to convey oil from the ends of the bearing to the center thereof, a hub having an oil-hole, and an axle-box provided at its outer face with a recess communicating with the oil-hole of the hub, said axle-box being provided with an oil-passage extending from the recess to the bearing, substantially as described.

5. In a device of the class described, the combination of an axle, conical bearing-sleeves provided at their upper faces with longitudinal grooves or gutters terminating short of the outer ends of the sleeves, a hub having an oil-hole and provided at its ends with annular recesses, an axle-box provided with a central recess communicating with the oil-hole of the hub and with the center of the bearing, and dust-caps covering the ends of the axle-box and the sleeves and provided with annular flanges extending into the annular recesses of the hub, substantially as described.

6. In a device of the class described, the combination of a hub having an oil-hole, a plug fitting therein and provided at its outer end or head with a recess, and a spring mounted on the hub and engaging the recess of the plug, substantially as described.

In testimony that I claim the foregoing as my own I have hereto affixed my signature in the presence of two witnesses.

REUBIN C. PATTERSON.

Witnesses:
F. C. BRANAN,
W. R. NEWBY.